Patented Jan. 1, 1924.

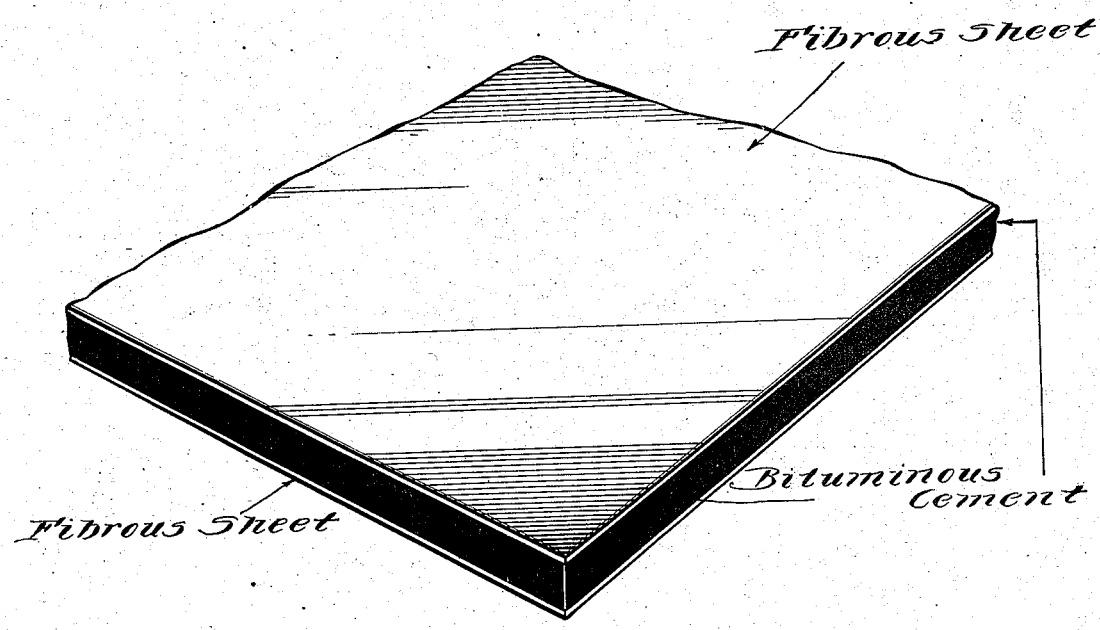

1,479,043

UNITED STATES PATENT OFFICE.

LESTER KIRSCHBRAUN, OF CHICAGO, ILLINOIS.

WATERPROOF AND MOISTUREPROOF SHEET AND PROCESS OF MAKING SAME.

Application filed August 16, 1922. Serial No. 582,305.

*To all whom it may concern:*

Be it known that I, LESTER KIRSCHBRAUN, a citizen of the United States, residing in the city of Chicago, county of Cook, State of Illinois, having invented certain new and useful Improvements in Waterproof and Moistureproof Sheets and Processes of Making Same, of which the following is a specification.

This invention relates to the manufacture of waterproof and moistureproof sheets and is more particularly directed to a product in which dry sheets of paper are pasted together by means of a cold bituminous cement in emulsion form.

This bituminous cement may be formed in accordance with the process described in my prior Patent No. 1,417,835.

I have found that the following emulsion makes a very satisfactory cement:

Ten parts of steam-distilled Mexican asphalt of 120° to 130° Fahrenheit melting point, one part of bentonite and ten parts of water, by weight. It is desirable to use as little of the emulsifying agent as feasible in order to have a maximum stickiness in the dried cement.

In carrying out the invention I may take two sheets of dry paper and cement or paste them together by applying the emulsion to the opposed surface of the sheets, uniting the sheets and passing them through presser and drying rolls in such a way as to remove the water and permit the asphalt to coalesce. This forms a continuous waterproof and moistureproof menstrum between the opposed plies of paper.

In some instances it may not be necessary to pass the sheets between drying rolls, particularly if heavy sheets are used, as the sheets may simply dry without the application of artificial heat. It is desirable to use an emulsifying agent such as bentonite for the reason that an emulsion formed with bentonite produces a smoothly flowing composition in which the asphalt is easily suspended in finely dispersed form. It is to be noted that this permits of the use of a cold bituminous paste or cement. By the use of this cold emulsion any waste scrap collected prior to setting of the emulsion can be recovered by being maintained in a wet condition.

I am mentioning the pasting together of ordinary sheets of paper. The invention is also applicable to the invention of corrugated sheets as for example, strawboard and the like. Instead of using bentonite in some cases it may be possible to use high-grade colloidal clay and instead of Mexican asphalt of the character referred to, various kinds of asphalts and vegetable or mineral pitches may be used.

It is to be particularly noted that the emulsion above referred to should be of a relatively highly stable character so that it will not readily break down during the spreading operation, i. e., when it is spread over the face of the sheets and thus tend to interfere with the operation of the machine.

I claim as my invention:

1. A process of making a waterproof and moistureproof sheet consisting in making an emulsion miscible in water and containing pitch and an emulsifying agent such as bentonite and then applying said emulsion between opposed surfaces of fibrous sheets, removing the water and permitting the pitch to coalesce and form a bituminous cement.

2. A process of making a waterproof and moistureproof sheet consisting in making an emulsion miscible in water and containing pitch and an emulsifying agent and then applying said emulsion between opposed surfaces of fibrous sheets, removing the water and permitting the pitch to coalesce and form a bituminous cement.

3. A waterproof and moistureproof composite sheet consisting of opposed sheets and a bituminous cement containing an emulsifying agent interposed therebetween.

LESTER KIRSCHBRAUN.